No. 719,293. PATENTED JAN. 27, 1903.
E. A. ARCOUET.
TIRE.
APPLICATION FILED APR. 2, 1901.
NO MODEL.
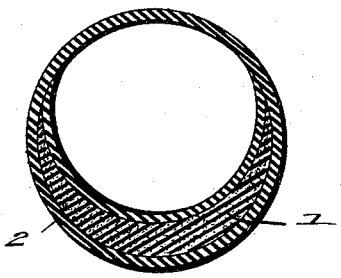

UNITED STATES PATENT OFFICE.

EDWARD A. ARCOUET, OF CHICAGO, ILLINOIS.

TIRE.

SPECIFICATION forming part of Letters Patent No. 719,293, dated January 27, 1903.

Application filed April 2, 1901. Serial No. 54,080. (No model.)

*To all whom it may concern:*

Be it known that I, EDWARD A. ARCOUET, a citizen of the United States, residing at Chicago, in the county of Cook and State of Illinois, have invented new and useful Improvements in Tires, of which the following is a specification.

This invention relates to new and useful improvements in tires and the process of manufacturing the same; and its primary object is to provide a tire which is inexpensive to manufacture, durable, and difficult to puncture.

With these and other objects in view the invention consists in the novel construction and process of manufacture hereinafter more fully described and claimed.

The tire is formed of a composition consisting of the following ingredients, combined, vulcanized, and molded in about the proportions stated, viz: Leather scrap ground to powder and a solution of rubber-cement mixed into a pulp and ground, forty parts; ordinary rubber, sixty parts. The solution of rubber-cement and leather-scrap powder are thoroughly mixed by slowly adding the leather-scrap powder to the rubber-cement until a pulp or thick mass is secured, the ingredients being thoroughly mixed by stirring. This mixture is then ground and mixed with sixty parts of rubber, such as is commonly used in the manufacture of solid tires, and the complete mixture is vulcanized and molded into proper form. If desired, a small quantity of ground hemp may be added to the composition above described, the same serving as a bond.

Although I have described the tire as constructed entirely of the composition above described, I may, if desired, employ a shield of this material, which may be inclosed within the tread of an ordinary rubber tire. I have illustrated this form of tire in the accompanying drawing, in which 1 is the composition shield, and 2 the body of the tire.

Having thus described my invention, what I claim as new and patentable, and desire to secure by Letters Patent, is—

The process of making a tire by compounding a composition for the same comprising leather scrap ground to powder, a solution of rubber-cement mixed into the pulp and ground, ordinary tire-rubber and hemp, the above parts being in substantially the proportions specified and congregated together by slowly mixing the leather powder with the rubber-cement then stirring said parts together until a thick pulp or mass is secured, the mixture being then ground together and mixed with tire-rubber and hemp and then molded into proper form and thereafter vulcanized, substantially as specified.

In testimony whereof I affix my signature in presence of two witnesses.

EDWARD A. ARCOUET.

Witnesses:
 THOMAS J. COCHRAN,
 JOSEPH E. SCHABER.